Jan. 12, 1954 T. W. PAUL 2,665,631
CROP-HANDLING MACHINE AND DRIVE MECHANISM THEREFOR
Filed July 7, 1951 2 Sheets-Sheet 2
Fig. 3
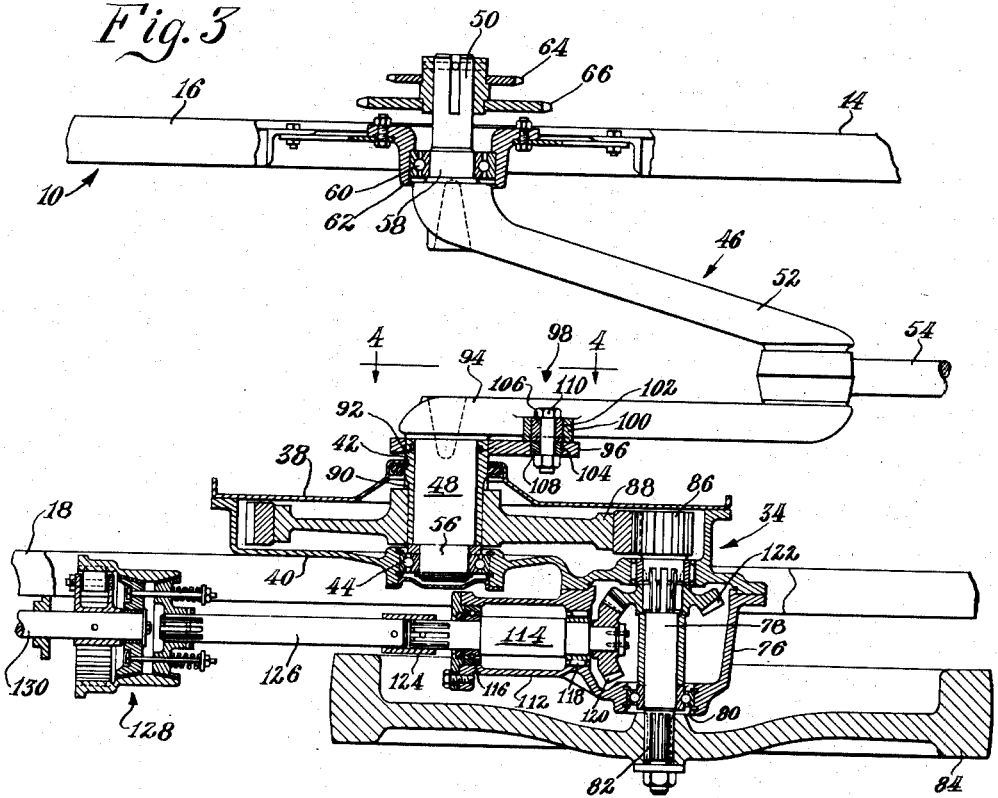
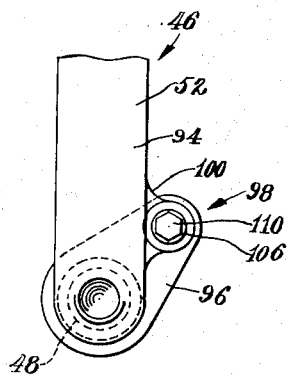
Fig. 4
INVENTOR.
T. W. Paul
BY
Attorneys Patented Jan. 12, 1954

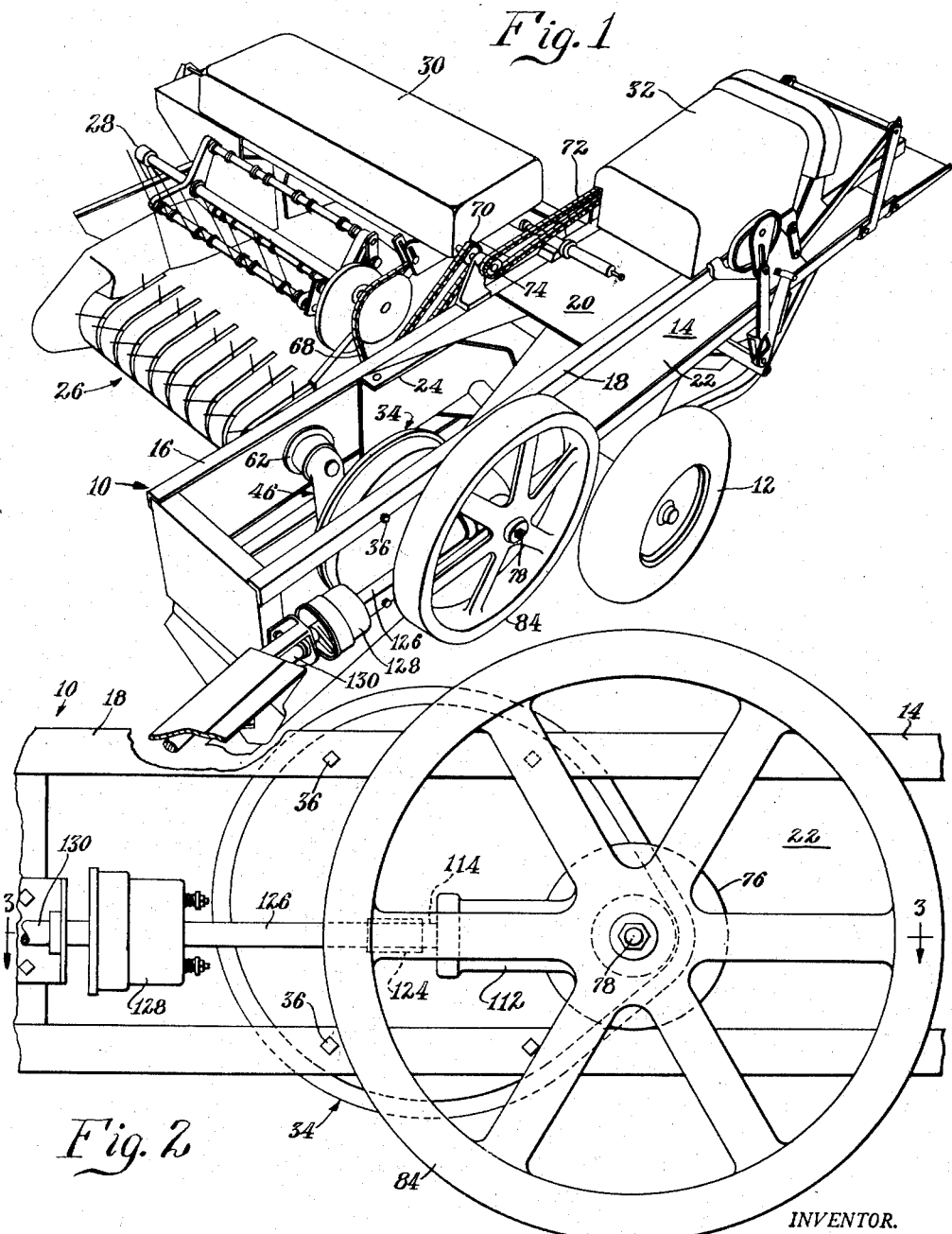

2,665,631

UNITED STATES PATENT OFFICE 2,665,631

CROP-HANDLING MACHINE AND DRIVE MECHANISM THEREFOR

Talbert W. Paul, Moline, Ill., assignor to Deere & Company, Moline, Ill., a corporation of Illinois Application July 7, 1951, Serial No. 235,662

3 Claims. (Cl. 100—179)

This invention relates to an agricultural machine and more particularly to driving mechanism therefor.

The invention pertains particularly to the driving mechanism for an agricultural baler of the type having an elongated bale case or chamber in which a plunger is reciprocable by input means including a flywheel. It is common in the operation of a baler for the plunger and other crop-handling elements to encounter obstacles of such magnitude as to cause breakage of or damage to certain of the operating parts. For this reason, it is conventionally known to utilize overload-releasable drive connections in the power train. The use of such releasable driving connections becomes increasingly important in the operation of a baler or other machine in which a flywheel is utilized, because the kinetic energy of the flywheel becomes a factor to be considered. Many balers or similar machines are provided with releasable connections in the form of shear pins used between the flywheel and the driving part, such as the crankshaft for the plunger. An arrangement of this type is typical of the older style stationary balers, in which the power input means comprised a belt trained about the flywheel. In the event of stoppage of a plunger in a baler of that type, the shear pin would fracture and the power input and the flywheel— being one—would be simultaneously disconnected from the crankshaft. However, in later model balers of the pick-up type the power input comprises a power train connected to the power take-off shaft of a tractor, for example. Hence, a simple overload-releasable connection between the flywheel and the crankshaft would suffice only to disconnect the power from the crankshaft, leaving the flywheel free to tend to overdrive the power input. In other balers, the releasable connection, such as a shear pin, is utilized between the input and the flywheel. A shear pin in this position is subject to fracture upon stoppage of the plunger, for example, and thus disconnects the flywheel from both the input means and the crankshaft, wherefore the flywheel can run freely without driving either the power means or the crankshaft. However, power still remains connected to the plunger. According to the present invention, an overload-releasable driving connection is utilized between the crankshaft and the power input means, but this connection is used in parallel rather than in series with the flywheel, whereby, upon stoppage of the plunger, the shear pin fractures and the power input means can continue to run. It is a further feature of the invention to utilize in conjunction with the shear pin an over-running clutch between a power source and the power input means so that upon stoppage of the plunger the flywheel is allowed to run free and overrun the power source instead of tending to overdrive the power source.

It is a further object of the invention to provide an improved drive means in which the overload-releasable connection is readily available. In this respect, the drive means includes a gear housing located at one side element of an elongated bale case and this gear housing contains certain parts of the drive mechanism, including a flywheel at one side and externally of the housing and a driving member at the other side and also externally of the housing. The driving member is preferably connected to the crankshaft by a shear pin. The location of this connection is such that the shear pin may be readily replaced without interfering with any of the other driving mechanisms. When the overrunning clutch is used, this element is likewise externally of the housing so as to facilitate servicing thereof.

The foregoing and other important objects and desirable features inherent in and encompassed by the invention will become apparent as the following disclosure proceeds in connection with a preferred embodiment of the invention.

In the drawings:

Figure 1 is a perspective view of a baler embodying the features of the invention;

Figure 2 is a fragmentary side elevational view on an enlarged scale showing the arrangement of the housing, bale case, and flywheel;

Figure 3 is an enlarged sectional view taken substantially on the line 3—3 of Figure 2; and Figure 4 is a fragmentary elevational view as seen generally along the line 4—4 of Figure 3.

The baler chosen for the present purposes to illustrate a typical agricultural machine of that class comprises supporting structure 10 carried on a pair of ground-engaging wheels, only one of which appears at 12 in Figure 1. The supporting structure includes longitudinal framework providing a bale case 14 of elongated construction having transversely spaced apart upright side elements 16 and 18. The bale case structure further includes a plurality of angularly related walls 20 and 22 that define, in conventional manner, a baling chamber within which bales are formed by a conventionally reciprocating plunger 24.

The baler includes at one side thereof pick-up mechanism 26 which operates to pick up hay or straw from windrows as the machine is drawn forwardly over a field by a tractor (not shown) or equivalent propelling source. Operating in conjunction with the pick-up means 26 is a feeder 28 which moves the picked up hay rearwardly to transversely operating means (not shown) contained in a transverse enclosure 30. The means in the enclosure 30 moves the material into the bale chamber ahead of the reciprocating plunger so that as the plunger reciprocates, the accumulated material is compacted into bale form. In Figure 1, the numeral 32 represents a housing within which is contained tying mechanism of any suitable form for automatically tying the bales formed in the bale case 14.

The supporting structure 10 carries at one side thereof adjacent the forward end of the machine auxiliary supporting means in the form of a gear housing designated generally by the numeral 34. This housing may be removably supported in any conventional manner in the side element 18. A plurality of cap screws 36 is here shown as representative of such. The housing 34 has an inner side or wall portion 38 parallel to and inwardly of the side element 18. The housing further includes an outer wall or side portion 40. The inner wall 38 is apertured at 42 on an axis transverse to the length of the bale case 14. This aperture is coaxial with a bearing 44 mounted in the wall 40 of the housing 34.

The baler includes a crank shaft 46 having first and second shaft portions 48 and 50 coaxially spaced on the axis of the bearing 44 and further having a radial crank throw 52. This crank throw is connected by pitman means 54 to the reciprocating plunger 24.

The extreme inner end of the shaft portion 48 of the crankshaft 46 is reduced as at 56 and is journaled in the bearing 44. The other shaft portion 50 has an annular shoulder 58 journaled in a bearing 60 carried in a bearing support 62 in the opposite side element 16 of the supporting structure 10. The shaft portion 50 carries a pair of sprockets 64 and 66 that are utilized to drive other crop-handling elements of the baler, such as the pick-up 26, feeder 28, and mechanism carried within the enclosure 30. Representative drive connections are illustrated at 68 and 70 in Figure 1. The details of these drive connections are unimportant. It is sufficient only that the shaft portion 50 and sprockets 64 and 66 serve as power output means for additional crop-handling components. Thus, the crankshaft serves to drive a first crop-handling element represented by the plunger 24 and also to drive the crop-handling elements represented by the pick-up 26 and feeder 28. In addition, other crop-handling elements may derive power from the shaft portion 50 of the crankshaft. For example, a chain 72 is illustrated in Figure 1 as being trained about a sprocket on a shaft 74 that derives power from the chain 70. The chain 72 may be used to drive the tying mechanism within the enclosure 32.

The outer wall 40 of the housing may have integral therewith or as any auxiliary part thereof a housing portion 76 within which is journaled an input or flywheel shaft 78. This shaft is parallel to the axis of the crankshaft portions 48 and 50 and extends outwardly through an aperture 80, which aperture may be considered to be formed in the outer wall 40 of the housing 34. The extreme outer end of the shaft 78 is splined at 82 to carry for rotation therewith a flywheel 84.

The shaft 78 has keyed to its extreme inner end a pinion 86 in constant mesh with a gear 88 keyed at 90 to a central sleeve 92 that loosely surrounds the shaft portion 48 of the crankshaft 46. The sleeve 92 has its inner end enclosed within the housing 34 and has its outer end in proximity to one arm 94 of the crankshaft throw 52.

The outer end of the sleeve 92 has rigidly secured thereto, as by welding, a radial arm 96 that lies alongside the arm 94 of the crankshaft throw 52. The arms 94 and 96 constitute driving members and an overload-releasable driving connection, designated generally by the numeral 98, is established between them.

This driving connection comprises a portion 100 on the crankshaft arm 94 in which is formed an aperture or recess 102 on an axis parallel to the journaling axis of the crankshaft. The arm 96 is formed with an aperture 104 and these apertures 102 and 104 are normally alined or coaxial. The apertures 102 and 104 respectively receive shearing members in the form of bushings 106 and 108, each of which bushings has a radial end face lying in a plane normal to the axis on which the bushings are coaxial. The proximate radial faces of the bushings meet in an interface in a shearing plane normal to the axis on which the bushings are coaxial.

A frangible element in the form of a shear pin or bolt 110 is passed through the bushings 106 and 108 and serves normally to interconnect the arms 94 and 96 for movement together. During operation of the baler, forces tend to separate the arms 94 and 96 in a direction parallel to the plane of the interface of the proximate ends of the bushings 106 and 108. The shear pin or bolt 110 is sufficiently strong to resist forces of normal magnitude.

The crankshaft 52 is expected normally to be a casting and therefore will be of relatively soft material. The bushings 106 and 108 are preferably of steel, and therefore of a material considerably harder than the material of which the crankshaft will be cast. One the other hand, the sheer pin or bolt 110 will be of material relatively softer than the shearing elements or bushings 106 and 108, being conventionally constructed of bronze or an equivalent alloy.

Although it is possible to utilize the shear pin 110 alone without the bushings 106 and 108, the presence of the bushings increases the efficiency of the connection. For one thing, the bushings, being harder, serve as dies for accomplishing shearing of the pin 110. Without the bushings, the inter-connection between the arms 94 and 96 would be relatively loose and the tolerances would be so great as to permit the pin 110 to be battered, which would contribute to its premature failure.

The housing 34 includes at its outer side or wall portion 40 a forward extension 112 within which is journaled a shaft 114 forming part of an input driving mechanism to be presently described. The shaft 114 extends forwardly at right angles to the transverse flywheel shaft 78 and is journaled at its front and rear ends in appropriate bearings 116 and 118. The shaft 114 has keyed to its rear end a bevel pinion 120 which is in constant mesh with a bevel pinion 122 keyed to the flywheel shaft 78. Thus, the driving connection between the shaft 114 and the flywheel 84 is of a permanent nature. As respects the shaft 78, the flywheel 84 and crankshaft 46 are connected in parallel. That is to say, power may be interrupted between the crankshaft 46 and the shaft 78 without affecting the transmission of power between the shaft 114 and the shaft 78.

The shaft 114 is coupled at 124 to a forward continuing shaft 126 which is in turn connected by driving means in the form of an overrunning clutch 128 to a power source shaft 130. The shaft 130 may derive power in the first instance from the power take-off shaft of a tractor, for example. The overrunning clutch may be of any construction, that shown being typical of many that could be used. Its details are unimportant here.

In the operation of the machine, power is supplied by means of the shaft 130 through the overrunning clutch 128 to the input shaft 126— 114. The flywheel 84 is driven through the shaft 78 at the outer side of the bevel pinion 122, the bevel pinions 120 and 122 being in constant mesh and thereby forming a permanent connection between the shaft 114 and the flywheel, as previously stated. Driving of the shaft 78 by the shaft 114 results in driving of the gear 88 via its constant mesh with the small pinion 86. The gear 88 is keyed to the sleeve 92, and since the driving connection 98 is normally effective, the crankshaft 46 will be rotated and the plunger 24 will be driven, as will other components of the baler connected to the crankshaft, as via the sprockets 64 and 66 at the inner end of the shaft portion 50 of the crankshaft. In the event that an overload condition obtains, as when the plunger encounters an obstacle in the bale chamber, the plunger will become stopped, which will result in stoppage of the crankshaft 46, whereupon the shear pin 110 will fracture and the driving mechanism to the other side of the shear pin will continue to operate. Thus, damage to the plunger and other parts is prevented.

At the same time, the rotating flywheel 84 will tend to run away relative to the shaft 130. However, the overrunning clutch accommodates this tendency of the flywheel and permits the flywheel to run freely. The kinetic energy developed by the flywheel is amplified somewhat by that stored in the other rotating parts, such as the gear 88 and pinions 120 and 122 that are connected to the flywheel. The combination of the overload-releasable means 98 and the overrunning clutch 128 thus admirably serves to protect the operating components against damage.

Since the connection 98 is between the flywheel and crankshaft, the overrunning tendency of the flywheel has no effect on the crankshaft after the connection 98 is fractured. Another feature of the invention is the convenient location of the connection 98. It will be observed that this connection is external as respects the housing 34 and therefore is readily accessible for replacing of the shear pin.

Various other features of the invention not specifically enumerated will undoubtedly occur to those versed in the art, as likewise will numerous modifications and alterations in the preferred embodiment of the invention disclosed, all of which may be achieved without departing from the spirit and scope of the invention as defined in the appended claims.

What is claimed is:

1. A baler, comprising: an elongated bale case structure including parallel side elements spaced apart transversely relative to the length of said structure; a plunger reciprocable lengthwise of said structure and between said side elements; a drive housing carried by said structure alongside one of said side elements and including an inner wall having an opening on a first axis transverse to said structure and facing inwardly and an outer wall facing outwardly and having an opening on a second axis spaced from and parallel to the first axis; a crank shaft between said side elements and rotatable on said first axis, and having a first shaft portion entering the housing through the opening in the inner wall, a coaxial second shaft portion proximate to the other of said side elements, and a radial crank throw connected to the plunger; sleeve means concentric with and rotatably surrounding the first shaft portion and extending through said inner wall opening and having an external end exposed inwardly of said inner wall and an enclosed end within the housing; a drive shaft journaled in the housing on said second axis and projecting outwardly through the opening in the outer wall of the housing; a flywheel outside the outer wall of the housing and fixed to said drive shaft; drive means within the housing and interconnecting said drive shaft and the inner end of the sleeve means; and overload-releasable drive means external to the housing inwardly of the inner wall and connecting the sleeve means and the crankshaft.

2. The invention defined in claim 1, further characterized in that: the overload-releasable means comprises a radial arm fixed to the outer end of the sleeve means and lying closely alongside the crank throw; said crank throw and said radial arm have aligned apertures therein; and a frangible drive connection passed through said alined apertures and normally interconnecting the crank throw and the arm.

3. The invention defined in claim 2, further characterized in that: the frangible connection is a pin of relatively soft material and has a cross-sectional dimension smaller than that of the apertures; and each aperture is filled with a bushing of relatively harder material, each bushing relatively tightly fitting its aperture and relatively tightly surrounding its respective portion of the pin, and said bushings meeting face to face in a shearing plane between the arm and crank throw.

TALBERT W. PAUL.

References Cited in the file of this patent

UNITED STATES PATENTS

| Number | Name | Date |
|---|---|---|
| 514,384 | Sellon | Feb. 6, 1894 |
| 553,599 | Robison | Jan. 28, 1896 |
| 628,001 | Harrington | July 4, 1899 |
| 907,654 | Tuttle | Dec. 22, 1908 |
| 1,870,153 | Thoman | Aug. 2, 1932 |
| 1,942,512 | Lee | Jan. 9, 1934 |
| 2,307,556 | Wileman | Jan. 5, 1943 |
| 2,384,188 | Mercier | Sept. 4, 1945 |
| 2,438,676 | Nickle et al. | Mar. 30, 1948 |
| 2,524,233 | Russell | Oct. 3, 1950 |